United States Patent
Koskas et al.

(10) Patent No.: US 12,418,398 B2
(45) Date of Patent: Sep. 16, 2025

(54) HOMOMORPHIC ENCRYPTION METHOD AND ASSOCIATED DEVICES AND SYSTEM

(71) Applicant: RAVEL TECHNOLOGIES, Paris (FR)

(72) Inventors: Michel Koskas, Paris (FR); Philippe Chartier, Rennes (FR); Mohammed Lemou, Acigné (FR); Florian Mehats, Rennes (FR)

(73) Assignee: RAVEL TECHNOLOGIES, Paris (FR)

( * ) Notice: Subject to any disclaimer, the term of this patent is extended or adjusted under 35 U.S.C. 154(b) by 276 days.

(21) Appl. No.: 18/268,103

(22) PCT Filed: Dec. 18, 2020

(86) PCT No.: PCT/IB2020/001147
§ 371 (c)(1),
(2) Date: Jun. 16, 2023

(87) PCT Pub. No.: WO2022/129979
PCT Pub. Date: Jun. 23, 2022

(65) Prior Publication Data
US 2024/0064000 A1    Feb. 22, 2024

(51) Int. Cl.
*H04L 9/00* (2022.01)

(52) U.S. Cl.
CPC ................... *H04L 9/008* (2013.01)

(58) Field of Classification Search
CPC .................................................. H04L 9/008
See application file for complete search history.

(56) References Cited

U.S. PATENT DOCUMENTS

2023/0188318 A1* 6/2023 Paillier .................. H04L 9/008
380/28

OTHER PUBLICATIONS

TFHE: Fast Fully Homomorphic Encryption Over the Torus by Gama-Gama, published 2019. (Year: 2019).*

(Continued)

*Primary Examiner* — Vu V Tran
(74) *Attorney, Agent, or Firm* — Pillsbury Winthrop Shaw Pittman LLP

(57) ABSTRACT

An homomorphic encryption technique enables one to carry on operations on encrypted messages without decrypting them, these encrypted messages being associated to unencrypted messages that belong to a discrete set consisting of $p_i$ distinct elements, with $p_i$ being an odd number, the elements of the discrete set being such that twice the difference between any two of these elements is not an integer number, said discrete set being for instance the discrete torus $T_{pi}=\{-(p_i-1)/2, -(p_i-1)/2+1, \ldots, (p_i-1)/2-1, (p_i-1)/2\}/p_i$. In particular, a specific bootstrapping procedure form such encrypted messages is disclosed. The disclosed technology concerns also an homomorphic encryption technique for carrying on operations on encrypted messages associated to unencrypted messages that belong $Z_p$, p being equal to the product of r integer numbers $p_i$, i=1 . . . r that are pairwise coprime. The disclosed technology concerns also associated electronic devices and systems implementing such techniques.

17 Claims, 2 Drawing Sheets

(56) References Cited

OTHER PUBLICATIONS

International Search Report as issued in International Patent Application No. PCT/IB2020/001147, dated Sep. 13, 2021.

Chillotti, I., et al., "TFHE: Fast Fully Homomorphic Encryption over the Torus*," International Association for Cryptologic Research, vol. 20180510:205538, May 2018, XP061025748, Retrieved from the Internet: URL:http://eprint.iacr.org/2018/421.pdf [retrieved on May 8, 2018], pp. 1-59.

Okada, H., et al., "Integer-Wise Functional Bootstrapping on TFHE: Applications in Secure Integer Arithmetics," Advances in Intelligent Data Analysis XIX; [Lecture Notes in Computer Science; Lect. Notes Computer], vol. 7, No. 499304, Nov. 2020, XP047572334, pp. 107-125.

Chillotti, I., et al., "Programmable Bootstrapping Enables Efficient Homomorphic Inference of Deep Neural Networks," Oct. 2020, XP055837258, Retrieved from the Internet: URL:https://whitepaper.zama.ai/whitepaper.pdf> [retrieved on Sep. 2, 2021], 14 pages.

Halevi, S., et al., "An Improved RNS Variant of the BFV Homomorphic Encryption Scheme," Advances in Databases and Information Systems; [Lecture Notes in Computer Science; Lect.Notes Computer], Feb. 2019, XP047502870, pp. 83-105.

\* cited by examiner

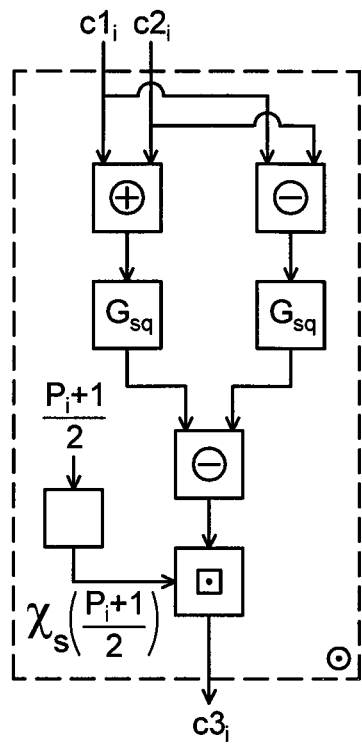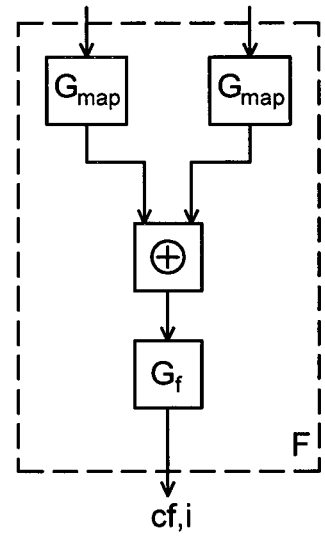
Fig. 1  Fig. 2
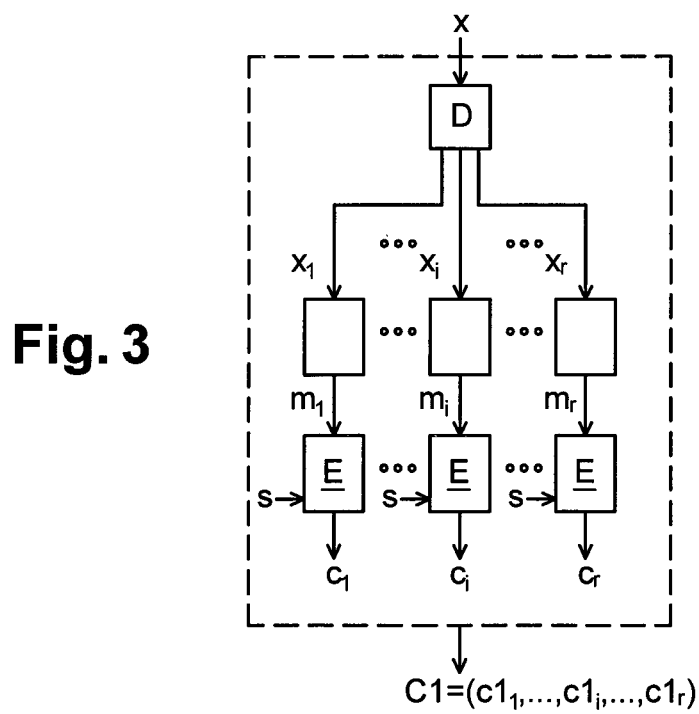
Fig. 3

HOMOMORPHIC ENCRYPTION METHOD AND ASSOCIATED DEVICES AND SYSTEM

CROSS-REFERENCE TO RELATED APPLICATIONS

This application is the U.S. National Stage of PCT/IB2020/001147, filed Dec. 18, 2020. The content of this application is incorporated herein by reference in its entirety.

TECHNICAL FIELD

The disclosed technology concerns methods, devices and systems for homomorphic encryption.

BACKGROUND

Homomorphic encryption, which allows one to perform calculations or data processing on encrypted data, without decrypting it first, has attracted a lot of attention recently.

Indeed, digital data processing of personal data has become ubiquitous in our everyday lives. Confidentiality and privacy protection of such data has thus become critical, as such personal data tends to circulate more and more in our digital environment.

In this context, homomorphic encryption is a very promising solution, as it enables to process data while preserving very securely data anonymization and privacy at the same time, as the data is not decrypted during its processing.

Homomorphic encryption is usually based on the "learning with error" encryption scheme, in which the encrypted message c=(a,b) is derived from the unencrypted message m according to the following formula: b=m+e+a·s, where:
  s is a secret key,
  a is randomly chosen vector, for projecting the secret key s, and
  e is a random noise component, added to m+a·s.

To decrypt the message, someone possessing the secret key s may compute the quantity b−a·s (equal to m+e), and then round the result to remove the noise component e and retrieve the message m. Of course, the noise term e has to be, and to remain small enough, if one wants to be able to retrieve the message m.

When two encrypted messages are summed up, or even worse, when they are homomorphically multiplied together, one obtains an encrypted message, which is an encrypted version of the sum, or product of the two initial, unencrypted messages, whose noise component is higher than for the two initial encrypted messages.

So, to prevent the noise term from increasing and increasing in the course of data processing, a refreshing procedure, usually named "bootstrapping", is executed repeatedly, usually after each operation on the encrypted message c. This procedure produces a refreshed version of c, that is an encrypted message c' which is decrypted as m (when decrypted using s), and whose noise component is smaller than the one of c.

The bootstrapping procedure usually comprises the homomorphic (that is: in encrypted form) computation of $X^q \cdot V(X)$ where:
  V(X) is the following polynomial: $1+X+X^2+X^3+\ldots+X^{N-1}$,
  and q is equal to the integer number that is the nearest to 2N(b−a·s):

$$q = \lfloor 2N(b-a \cdot s) \rceil$$

The constant term of $X^q \cdot V(X)$ mod $(X^N+1)$, that is $\text{coef}_0 (X^q \cdot V(X))$, is a refreshed version of c: it is an encrypted version of m, but with a noise component e' smaller than the noise component e of c.

One may note that the initial noise e is somehow washed out when (homomorphically) computing q, thanks to the rounding operation $\lfloor \ \rceil$. In this operation, the factor 2N plays the role of an expansion factor, that enables to spread the possible values of b−a·s (impaired by some noise) sufficiently, before rounding.

Such a bootstrapping procedure is very useful and ingenious, but also very time-consuming (in particular because the operations involved have to be carried on homomorphically), all the more that it has to be executed repeatedly.

The homomorphic encryption scheme succinctly described above, which combines "learning with error" and a bootstrapping procedure, is usually carried on with binary messages (that is, messages whose values are either 0 or 1). Indeed, in this technical field, most of the tools have been specifically developed and optimized for such messages.

To perform homomorphic operations on a longer message, the message is decomposed into binary messages (classical binary decomposition), each binary message is encrypted separately, and the operation is then carried on, homomorphically, bit by bit. But in this process, one has to take into account the (encrypted) carry resulting from each binary addition, and to propagate this carry to the next binary operation. The process is thus a serial one, which is time consuming. Besides, each binary operation is carried homomorphically, which multiplies the number of homomorphic (and thus time-consuming) operations.

SUMMARY

In this context, a homomorphic encryption technology, that enables to process efficiently messages longer than binary ones, is disclosed.

An aspect of this technology concerns a method for determining an encrypted message $c_i$, which is an encrypted version of a message $m_i$, $c_i$ being equal to $(a_i, b_i)$ where $b_i$ is determined from $m_i$ and from a secret key s, $b_i$ being equal to $m_i + e_i + a_i \cdot s$ with $a_i$ being a randomly selected vector for projecting s and $e_i$ being a random noise component added to $m_i + a_i \cdot s$,
wherein the message $m_i$ belongs to a discrete set consisting of $p_i$ distinct elements, with $p_i$ being an odd number and wherein the elements of said discrete set are such that twice the difference between any two of these elements is not an integer number, said discrete set being the discrete torus $$T_{pi} = \frac{1}{p_i} \left\{ -\frac{p_i-1}{2}, -\frac{p_i-1}{2}+1, \ldots, \frac{p_i-1}{2}-1, \frac{p_i-1}{2} \right\},$$

or the set $T_{pi,N}[X]$ of polynomials of degree N−1 whose coefficients belong to $T_{pi}$, or another discrete set in bijective relationship with $T_{pi}$.

The inventors have developed a homomorphic cryptographic technique for such "long" messages (longer than binary messages), enabling, among other things, adding, multiplying and refreshing (i.e.: bootstrapping) these messages while they remain encrypted. These operations are carried on without decomposing the message into binary, independently encrypted, smaller messages. In other words, the encrypted message is treated as a whole, with no decomposition onto smaller fields.

So, the burden of dealing with encrypted carries and serial processing of the numerous and encrypted bits is avoided.

It may be noted that the fact that a homomorphic processing is possible for long messages (without decomposing it), and the fact that this processing can be fast and efficient is far from being an immediate, straightforward result.

Indeed, as mentioned above, most of the homomorphic cryptography tools currently available are adapted specifically to binary messages. So, the inventors had to go against the usual practice and prejudices and had to move forward in the development of specific (and elaborated) tools intended for longer messages, without knowing whether a direct homomorphic processing of long messages was actually possible or not, or whether it could be executed efficiently or not. In particular, the inventors had to elaborate a new homomorphic multiplication scheme and a new bootstrapping method (presented below), to develop such an encryption protocol. Only once these quite complex tools had been developed could the inventors be sure that such a treatment could actually be carried out.

And, in the process of developing these new tools, the inventors realized that working with messages belonging to the discrete Torus $T_{pi}$, or to the set of polynomials $T_{pi,N}[X]$, or to another equivalent discrete set, with:
- pi being an odd number,
- and such that for any couple grouping two of the elements of said set, twice the difference between these two elements is not an integer number was very fruitful, as it turns out that these specific features make different operations, involved in the multiplication and bootstrapping process mentioned above, feasible (as will be described in more details later).

The fact that a direct homomorphic processing of a "long" message is not only possible, but that it can also be achieved efficiently, in a limited time, is also far from obvious, at first glance.

Indeed, when the message $m_i$ is long, that is when the integer number $p_i$ is quite large, for example equal to 17, 21, or more, one would expect at first sight to have to use polynomials whose degree N−1 is high, during bootstrapping operations. Indeed, as explained above, in the calculation of the quantity q, the integer N acts as a kind of expansion coefficient. So, when $p_i$ is large, as the possible values of the message $m_i$ (distributed in the interval]−1/2; 1/2]) are then close to each other, one expects to have to choose a number N that is large, in order to be able to spread these values sufficiently apart, before the rounding operation involved in the calculation of the quantity q. And a large N considerably increases the calculation time.

More precisely, a rough estimate leads to the conclusion that N would have to be of the order of 10000 (with pi=20 and n=500, for instance), or greater, for the bootstrapping operation to work properly (that is with a low probability of losing of degrading the message m during this operation). And such values of N are almost prohibitive, in terms of computation time.

But in fact, a complete, acute probability calculation shows that such a bootstrapping operation can be successfully performed with polynomials whose degree N−1 is much smaller than what the first approximate estimate mentioned above suggests. More precisely, it can be shown that an integer number N of the order of 1000 (e.g. 1024) turns out to be sufficient for typical values of pi (about 20-40, for example).

According to the disclosed technology, N may be selected as small as 50 times $p_i$, or below, or even below 30 times $p_i$, to take advantage of this surprisingly favorable scaling and accelerate the bootstrapping processing.

The method for bootstrapping developed by the inventors, mentioned above, is a method for bootstrapping an encrypted message $c_i=(a_i,b_i)$ determined as described above, this method comprising a determination of a refreshed encrypted message $c_i'=(a_i',b_i')$, which is an encrypted version of a value $g(m_i)$ of a function g applied to the message $m_i$, $c_i'$ having a noise component $e_i'$ smaller than $e_i$.

The determination of $c_i'$ comprises a step of determining homomorphically the constant coefficient $coef_0(X^q \cdot W_g(X))$ of $X^q \cdot W_g(X) \bmod (X^N+1)$, where $W_g(X) = \Sigma_{j=0}^{N-1} w_j \cdot X^j$ is a polynomial of degree N−1, whose coefficients $w_j$ are given by the following formula:

$$(-1)^{\lceil \lfloor 2Nm_i \rfloor / N \rceil} \cdot w_j = g(m_i), \text{ where } j = N \lceil \lfloor 2Nm_i \rfloor / N \rceil - \lfloor 2Nm_i \rfloor$$

with $\lfloor 2Nm_i \rfloor$ being the integer number that is the nearest to $2Nm_i$ and with $\lceil \lfloor 2Nm_i \rfloor / N \rceil$ being the ceiling function applied to $\lfloor 2Nm_i \rfloor / N$, and where q is the integer number that is the nearest to $2N(b_i - a_i \cdot s)$: $q = \lfloor 2N(b_i - a_i \cdot s) \rfloor$.

So, during this bootstrapping operation, in addition to reducing (refreshing) the noise component of a cipher text, an arbitrary function g can be applied to the corresponding message $m_i$.

This accelerates considerably numerous data processing routines. Indeed, to apply such a function g to a message, instead of: carrying on an elementary operation (homomorphically), then bootstrapping the result (to counter the noise increase due to the preceding operation), carrying on another elementary operation, then bootstrapping the result, and so on, one just has to execute one time the special bootstrapping procedure presented above.

In this bootstrapping procedure, the degree N−1 of the polynomial Wg(X) may be selected so as to be above $p_i$, or even above 5 times $p_i$.

The disclosed technology concerns also a method for homomorphically multiplying two messages $m1_i$ and $m2_i$, each belonging to the discrete torus $T_{pi}$ or to the set of polynomials $T_{pi,N}[X]$, the method comprising a determination of an encrypted message $c3_i$ which is an encrypted version of the product of $m1_i$ by $m2_i$, $c3_i$ being determined from encrypted versions $c1_i$ and $c2_i$ of the messages $m1_i$ and $m2_i$, without decrypting $c1_i$ or $c2_i$, the method comprising homomorphically determining $$\frac{(p_i+1)}{2} \cdot \left[ \frac{(p_i+1)}{2} \cdot p_i \cdot (m1_i + m2_i)^2 - \frac{(p_i+1)}{2} \cdot p_i \cdot (m1_i - m2_i)^2 \right]$$

Where $p_i \cdot (m1_i + m2_i)^2$ and $p_i \cdot (m1_i - m2_i)^2$, or $$\frac{(p_i+1)}{2} \cdot p_i \cdot (m1_i + m2_i)^2 \text{ and}$$

$$\frac{(p_i+1)}{2} \cdot p_i \cdot (m1_i - m2_i)^2, \text{ or}$$

$$\left[\frac{(p_i+1)}{2}\right]^2 \cdot p_i \cdot (m1_i + m2_i)^2 \text{ and}$$

$$\left[\frac{(p_i+1)}{2}\right]^2 \cdot p_i \cdot (m1_i - m2_i)^2$$

are determined homomorphically by executing the method for bootstrapping presented above, the function g being the function $g_{sq}: m_i \to p_i \cdot (m_i)^2$, or $$g_{sq}: m_i \to \frac{(p_i+1)}{2} \cdot p_i \cdot (m_i)^2,$$

or, respectively, $$g_{sq''}: m_i \to \left[\frac{(p_i+1)}{2}\right]^2 \cdot p_i \cdot (m_i)^2.$$

It may be noted that the tools presented above, for homomorphic processing of messages $m_i$ belonging to such a discrete set of $p_i$ elements (with $p_i$ odd), can, in addition to their own benefits, be applied in an extremely beneficial manner to a cryptographic technic for even longer messages, decomposed into smaller components $m_i$, based on the Chinese remainder theorem decomposition, which, again, enables to avoid the burden of dealing with carries (so, in other words, the tools mentioned above are some kinds of basic bricks of this Chinese-remainder processing method, presented in more detail below).

The disclosed technology concerns also a method for determining an encrypted message $c_{f,i}$, which is an encrypted version of a value $f(m1_i, m2_i)$ of a two-variable function f applied to messages $m1_i$ and $m2_i$, $m1_i$ and $m2_i$ belonging each to the discrete set mentioned above (for instance the torus $T_{pi}$ or the set of polynomials $T_{pi,N}[X]$), $c_{f,i}$ being determined from encrypted messages $c1_i$ and $c2_i$ without decrypting $c1_i$ or $c2_i$, $c1_i$ and $c2_i$ being encrypted versions of $m1_i$ and $m2_i$ respectively, that have been determined according to the method for encrypting presented above, the determination of $c_{f,i}$ comprising:

determining $c1'_i$ and $c2'_i$, from $c1_i$ and $c2_i$ respectively, by executing the method for bootstrapping presented above, the function g employed during this bootstrapping being a function $g_{map}$ that maps said discrete set onto a set $\underline{S}$ whose elements $\underline{\mu}_j$ belong each to the torus $T = ]-1/2, 1/2]$ and are such that, for any set of indexes (i,j,k,l) with $(i,j) \neq (k,l)$, $(k,l)$ being different from $(j,i)$: $\alpha \cdot \underline{\mu}_i + \beta \cdot \underline{\mu}_j$ is different from $\alpha \cdot \underline{\mu}_k + \beta \cdot \underline{\mu}_l$ modulo $1/2$, with $\alpha$ and $\beta$ being two constant and integer, given numbers, $c1'_i$ and $c2'_i$ being the encrypted versions of $\underline{m1}_i = g_{map}(m1_i)$ and $\underline{m2}_i = g_{map}(m2_i)$ respectively, where $\underline{m1}_i$ and $\underline{m2}_i$ belong each to $\underline{S}$, determining homomorphicically, from $c1'_i$ and $c2'_i$, an encrypted message $c_s$ which is an encrypted version of $\alpha \cdot \underline{m1}_i + \beta \cdot \underline{m2}_i$, determining $c_{f,i}$ from $c_s$ by executing the method for bootstrapping presented above, the function g employed during this bootstrapping being a one-variable function $g_f$ from T to $T_{pi}$, defined by the following condition:

for any couple of messages $m1_j$, $m2_j$ belonging each to said discrete set, $$g_f(\alpha \cdot \underline{m1}_j + \beta \cdot \underline{m2}_j) = f(m1_j, m2_j)$$

that is:

$$g_f[\alpha \cdot g_{map}(m1_j) + \beta \cdot g_{map}(m2_j)] = f(m1_j, m2_j).$$

According to an aspect of this technology, the elements of the set $\underline{S}$ are such that for any set of indexes (i,j,k,l) with $(i,j) \neq (k,l)$, $\alpha \cdot \underline{\mu}_i + \beta \cdot \underline{\mu}_j$ is different from $\alpha \cdot \underline{\mu}_k + \beta \cdot \underline{\mu}_l$ modulo $1/2$, even when $(k,l) = (j,i)$. In this case, one may have, in particular: $\alpha = 1$ and $\beta = -1$, $c_s$ being determined by computing the homomorphic difference $\ominus$ between $c1'_i$ and $c2'_i$: $c_s = c1'_i \ominus c2'_i$, or $\alpha = -1$ and $\beta = 1$, $c_s$ being determined by computing the homomorphic difference $\ominus$ between $c2'_i$ and $c1'_i$: $c_s = c2'_i \ominus c1'_i$.

According to another aspect of this technology, the function f is symmetric, $f(m1_j, m2_j)$ being equal to $f(m2_j, m1_j)$ for any couple of messages $m1_j$ and $m2_j$, $\alpha$ and $\beta$ are each equal to 1, and $c_s$ is determined by computing the homomorphic sum $\oplus$ of $c1'_i$ and $c2'_i$: $c_s = c1'_i \oplus c2'_i$.

The disclosed technology also concerns such a method for determining an encrypted message $c_{f,i}$, which is an encrypted version of a value $f(m1_i, m2_i)$ of a two-variable function f, as such, independently from the bootstrapping method in question. Indeed, as the skilled person will appreciate, the method for homomorphically evaluating f, based on the intermediate mapping of said discrete set (e.g.: $T_{pi}$) onto $\underline{S}$, can be achieved independently from this specific bootstrapping procedure, using any method for homomorphically mapping said discrete set on $\underline{S}$ (the mapping method being possibly different from the one described above), and using then any method for homomorphically applying a function like the function $g_f$ to the quantity $\alpha \cdot \underline{m1}_i + \beta \cdot \underline{m2}_i$.

According to an aspect of the disclosed technology, any of the methods presented above is executed by a computer (programmed or otherwise arranged to execute the method in question), that is an electronic device or system (possibly distributed among several distant, remote devices) comprising at least one processor for executing logical operations, and one memory device for storing data.

In particular, an aspect of the technology concerns an encrypting device, comprising one or more processors and at least one memory, the encrypting device being programmed to make the processor or processors executing the following steps:

receiving data representative of an unencrypted message $m_i$, that belongs to the discrete set mentioned above, processing said data according to the method for encrypting presented above, to determine encrypted data representative of the encrypted message $c_i$, the secret key s employed during said processing, stored at least transitorily in the memory of the encrypting device, being accessed by the processor or processors during said processing.

An aspect of the disclosed technology concerns a cryptographic system comprising such an encrypting device and a processing device, the processing device comprising one or more processors and at least one memory, the processing device being programmed to make the processor or processors executing the following steps:

receiving data, representative of an encrypted message $c_i$ produced by the encrypting device, processing said data, according to the method for bootstrapping that has been presented above, to determine refreshed data, representative of the encrypted message $c'_i$, said processing being achieved without decrypting $c_i$ and without using, reading or accessing the secret key s.

In particular, the secret key s may be completely absent from the processing device (which is a separate device distinct from the encrypting device), and remain absent from the processing device at all time.

The disclosed technology also concerns such a processing device, as such, independently from the encrypting device.

The processing device may also be programmed to execute the method for multiplying presented above, and the method for determining an encrypted message $c_{f,i}$, which is an encrypted version of a value $f(m1_i, m2_i)$ of the two-variable function f.

The disclosed technology concerns also a computer-readable program product comprising instructions that, when executed by a computer, make the computer to execute any of the method presented above.

The disclosed technology concerns also a method for determining an encrypted message C, which is an encrypted version of a message x belonging to $\mathbb{Z}_p = \mathbb{Z}/p\,\mathbb{Z}$, p being equal to $\Pi_{i=1}^{r} p_i$ where the integer numbers $p_i$ are pairwise coprime, the method comprising:

- decomposing x into its components $x_i$, i=1 ... r, with $x_i$ equal to x modulo $p_i$,
- for each component $x_i$ whose associated factor $p_i$ is odd, determining an encrypted version $c_i$ of a message $m_i$, according to the method for encrypting that has been presented above $m_i$ being, among the elements of said discrete set, the element that is associated to $x_i$ by a given bijective relationship between $\mathbb{Z}_{pi}$ and said discrete set,
- if a component $x_i$ is associated to a factor $p_i$ equal to 2, determining an encrypted version $c_i$ of a quantity $Q_i$ associated to $x_i$ and that can takes two distinct values $c_i$ being equal to $(a_i, b_i)$ with $b_i = Q_i + e_i + a_i \cdot s$,
- returning $C = (c_1, \ldots c_i, \ldots c_r)$.

An aspect of this technology concerns a method for bootstrapping the encrypted message $C = (c_1, \ldots c_i, \ldots c_r)$ determined according the encrypting method that has just been described, this (generalized) bootstrapping method comprising:

- for each $c_i$ whose associated factor $p_i$ is odd, determining a refreshed encrypted message $C'_i$, from $c_i$, by executing the method for bootstrapping that has been presented before,
- returning $C' = (c'_1, \ldots, c'_i, \ldots c'_r)$.

This technology concerns also a method for determining an encrypted message $C3 = (c3_1, \ldots c3_i, \ldots c3r)$, which is an encrypted version of the product of two messages x1 and x2, each belonging to $\mathbb{Z}_p$,

- C3 being determined from encrypted messages C1 and C2, without decrypting C1 or C2, C1 and C2 being encrypted versions of x1 and x2 respectively, $C1 = (c1_1, \ldots c1_i, \ldots c1_r)$ and $C2 = (c2_1, \ldots c2_i, \ldots c2_r)$ having been determined from x1 and x2 respectively, according to the method for encrypting that has just been presented, wherein said discrete set is $T_{pi}$ or $T_{pi,N}[X]$, and
- wherein each component $c3_i$ of C3 is determined from the corresponding components $c1_i$ and $c2_i$ of C1 and C2, according to the method for multiplying that was described above for messages belonging to the discrete torus $T_{pi}$, when $c1_i$ and $c2_i$ are associated to a factor $p_i$ that is odd.

The disclosed technology concerns such a method for bootstrapping a message C, or such a method for multiplying homomorphically two messages x1 and x2, in itself, independently from the bootstrapping method (for messages belonging to $T_{pi}$) that has been presented above. Indeed, as the skilled person will appreciate, these two methods, for processing encrypted messages, associated to unencrypted messages x belonging to $Z_p$ (with p being equal to $\Pi_{i=1}^{r} p_i$ where the integer numbers $p_i$ are pairwise coprime), take advantage of the Chinese remainder theorem to process the encrypted "sub-messages" $c_i$, i=1 ... r, independently from each other, without having to deal with, or anyhow considering (encrypted) carries. This technique could clearly be applied using other "sub-routines" than the one presented above, for the homomorphic processing of the sub-messages $m_i$. In particular, any multiplying or bootstrapping method for elements belonging to the discrete set mentioned above (e.g.: the discrete torus $T_{pi}$) could be used, instead of the one described above.

According to the disclosed technology, these encrypting and processing techniques (based on a "Chinese remainder" decomposition), could be executed by a computer.

The disclosed technology concerns also an electronic device, comprising at least one processor and one memory, programmed or otherwise configured to execute one of these methods. The disclosed technology concerns also a computer-readable program product comprising instructions, whose execution by a computer make the computer to execute anyone of these methods.

BRIEF DESCRIPTION OF THE DRAWINGS

Other characteristics and benefits of the disclosed technology will become clear from the description which is given below, by way of example and non-restrictively, in reference to the figure, in which:

FIG. 1 represents, as a block-diagram, operations carried on to multiply homomorphically two messages.

FIG. 2 represents, as a block-diagram, operations carried on to evaluate homomorphically a two-variable function.

FIG. 3 represents, as a block-diagram, an encryption step of a long message x, based on a Chinese remainder decomposition.

DETAILED DESCRIPTION

Figure 4:
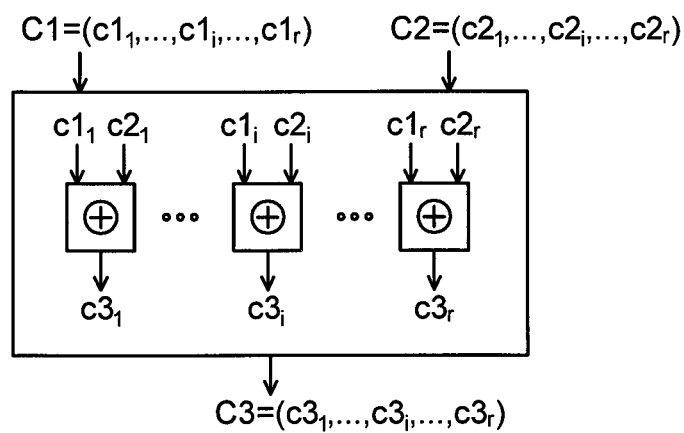
FIG. 4 represents, as a block-diagram, operations carried on to add homomorphically two encrypted messages obtained previously according to the encryption step of FIG. 3.

As mentioned above, the disclosed technology concerns an homomorphic encryption technique that enables to carry on operations on encrypted messages without decrypting them, these encrypted messages being associated to unencrypted messages that are each longer than a single bit, and that are processed without being decomposed into individual binary messages.

The disclosed technology concerns more particularly a technique for encrypting and processing messages $m_i$, that belong to a discrete set consisting of $p_i$ distinct elements, with $p_i$ being an odd number, these messages being encrypted and processed directly, without decomposing these messages into smaller (for instance binary) messages that would be encrypted separately. This technology is presented below in the case where the discrete set in question is the discrete torus $$T_{pi} = \frac{1}{p_i}\left\{-\frac{p_i-1}{2}, -\frac{p_i-1}{2}+1, \ldots, \frac{p_i-1}{2}-1, \frac{p_i-1}{2}\right\},$$

or the set $T_{pi,N}[X]$ of polynomials of degree N−1 whose coefficients belong to $T_{pi}$. Still, as the skilled person will appreciate, this technology can be applied as well (possibly, with minor modifications for the homomorphic addition or multiplication) to another discrete set of messages in bijective relationship with $T_{pi}$, like $$\mathbb{Z}_{pi} = \mathbb{Z}/p_i\mathbb{Z} \text{ or } \frac{1}{p_i}\left\{-\frac{p_i-1}{2}+1, \ldots, \frac{p_i-1}{2}-1, \frac{p_i-1}{2}, \frac{p_i-1}{2}+1\right\}$$

(that is $T_{pi}$ with an offset of $+1/p_i$; it may be noted that for this alternative example, the different operations described below—including the bootstrapping procedure, but also the homomorphic multiplication—can be implemented in the same manner as in the case of $T_{pi}$, even if the values may have to be shifted to reintegrate them in the interval [−1/2, 1/2[) for instance.

The disclosed technology concerns also a technique for encrypting and processing even longer messages x, using a specific decomposition of the message x into smaller messages $m_i$, this decomposition being based on the Chinese remainder theorem decomposition and enabling to process the sub-messages $m_i$ separately from each other, without having to take into account possible carries.

The encryption technique for encrypting and processing a message $m_i$, without decomposing it, will be presented first. The technique for encrypting and processing a longer message x, composed of several such messages $m_i$, based on a Chinese remainder theorem decomposition, will be presented then. Finally, electronic devices and systems for implementing such methods will be presented.

Homomorphic encryption and processing of a message $m_i$ belonging to $T_{pi}$, or to $T_{pi,N}[X]$.

As mentioned above, this homomorphic encryption technique is applied to messages $m_i$ that belong to the discrete torus $$T_{pi} = \frac{1}{p_i}\left\{-\frac{p_i-1}{2}, -\frac{p_i-1}{2}+1, \ldots, \frac{p_i-1}{2}-\frac{p_i-1}{2}\right\},$$

or to the set $T_{pi,N}[X]$ of polynomials of degree N−1 whose coefficients belong to $T_{pi}$.

More precisely, the set of polynomials $T_{pi,N}[X]$ is the finite field composed of the polynomials $T_{pi,N}[X]$ of degree N−1 defined modulo $X^N+1$, and whose coefficients belong to $T_{pi}$: $T_{pi,N}[X]=T_{pi}[X]/(X^N+1)$.

Remarkably, the integer number $p_i$ is odd (which makes some of the operations described below possible).

Encryption

An unencrypted message $m_i$, belonging to $T_{pi}$, is encrypted according to the "learning with error" scheme: the encrypted message $c_i=(a_i,b_i)$ (or, in other words, the cypher text $c_i$), which is the encrypted version of $m_i$, is determined by:

randomly choosing a vector $a_i$, and computing the quantity $b_i=m_i+e_i+a_i \cdot s$ where s is a secret key and where $e_i$ is a noise component, added to $m_i+a_i \cdot s$.

When $m_i$ belongs to $T_{pi}$, the noise component $e_i$ belongs to the torus T=]−1/2,1/2[. And when $m_i$ belongs to $T_{pi,N}[X]$, $e_i$ belongs to the set $T_N[X]$ of polynomials of degree N−1, defined modulo $(X^N+1)$ and whose coefficients belong each to T. $e_i$ is randomly chosen according to a predefined statistical distribution. At least one feature of this distribution, for instance its standard deviation (or the standard deviation of each of its coefficients, when $e_i$ is a polynomial), is determined depending on the integer number $p_i$. For instance, the standard deviation of this distribution is all the smaller than $p_i$ is high (this standard deviation may be inversely proportional to $p_i$, for example).

The secret key s is a vector having n components, each belonging to the set of integers Z, or to the set of polynomials of degree N−1, defined modulo $(X^N+1)$ and whose coefficients belong each to Z. In other words, s belongs to $Z^n$, or to $Z_N[X]^n$, where $Z_N[X]=Z[X]/(X^N+1)$. The secret key s may more particularly belong to $B^n$, or to $B_N[X]n$, where B={0, 1} (B being the set constituted by the binary values 0 and 1).

The vector $a_i$ has also n components, and is such that the scalar product $a_i \cdot s$ belongs either to $T_{pi}$ (when $m_i$ belongs to $T_{pi}$), or to $T_{pi,N}[X]$ (when $m_i$ belongs to $T_{pi,N}[X]$). For instance, if $m_i$ belongs of $T_{pi}$, and if s belongs to $B^n$, $a_i$ belongs to $T_{pi}^n$ (each of the n components of $a_i$ belongs to $T_{pi}$).

In the following, for the sake of clarity, we consider that $m_i$ belongs to $T_{pi}$, and that s belongs to $Z^n$ or $B^n$.

Besides, in the following, we consider more specifically that s belongs to $B^n$ (which simplifies some of the operations involved in the bootstrapping procedure described below).

To decrypt the encrypted message $c_i=(a_i,b_i)$, a decryption module or a decryption device that has access to the secret key s computes $b_i-a_i \cdot s$ (which is equal to $m_i+e_i$), and then rounds it to the nearest value belonging to the discrete Torus $T_{pi}$, thus removing the noise component $e_i$ and obtaining $m_i$.

The encrypted message $c_i$, obtained by encrypted $m_i$ using the secret key s, may be also noted $\tilde{\varphi}_s(m_i)$.

Homomorphic Operations

An objective of the instant technology is to carry on operations homomorphically, that is to say to carry on operations on one, two or more messages $m1_i, m2_i, \ldots$, but using their encrypted version $c1_i, c2_i, \ldots$ (instead of the unencrypted messages $m1_i, m2_i, \ldots$) and without decrypting them, without knowing or having access to the secret key s.

More generally, determining homomorphically a given quantity is meant determining an encrypted version of this quantity, on the basis of encrypted messages, without using or determining unencrypted versions (unencrypted counterparts) of these encrypted messages, and without using (in particular without accessing) the secret key s.

In practice, it is particularly interesting to be able to achieve two-operands homomorphic operations, like a homomorphic addition, multiplication or comparison of two messages (which is very useful for sorting encrypted data without decrypting them).

In the case of a two-operands operation, the usual ("normal") operation, whose operands are $m1_i$ and $m2_i$, is noted Op and its result is noted $m3_i$: $m3_i$=Op($m1_i,m2_i$). The corresponding homomorphic operation (that is, the homomorphic counterpart of Op) is noted Hop. So, the homomorphic operation Hop is an operation:

whose operands are two cipher texts $c1_i$ and $c2_i$, which are encrypted versions of two messages $m1_i$ and $m2_i$ respectively (each belonging to $T_{pi}$);

which produces a cipher text $c3_i$=Hop($c1_i,c2_i$), that it determined from $c1i$ and $c2i$ without decrypting $c1i$ or $c2_i$, without using the secret key s (in particular, without knowing or accessing the secret key s);

the cipher text $c3_i$ being an encrypted version of $m3_i$=Op $(m1_i, m2_i)$.

In other words, when decrypting $c1_i$, $c2_i$ and $c3_i$ using the secret key s, one gets respectively $m1_i$, $m2_i$ and $m3_i$=Op $(m1_i, m2_i)$.

Homomorphic Addition

The homomorphic addition is noted $\oplus$, (Hop=$\oplus$). The homomorphic addition of two cipher texts, $c3_i$=$c1_i \oplus c2_i$, is readily achieved by summing the two cipher texts $c1_i$=$(a1_i, b1_i)$ and $c2_i$=$(a2_i, b2_i)$ component by component: $c3_i$=$(a3_i, b3_i)$ with $a3_i$=$a1_i$+$a2_i$ and $b3_i$=$b1_i$+$b2_i$.

Indeed, $b3_i$−s·$a3_i$=$m1_i$+$m2_i$+$e1_i$+$e2_i$ is rounded as $m1_i$+$m2_i$ (provided that $e1_i$+$e2_i$ is small enough). So, $c3_i$=$c1_i \oplus c2_i$ is indeed decrypted as $m3i$=$m1_i$+$m2_i$.

A homomorphic subtraction $\ominus$ can be achieved similarly by subtracting two cipher texts component by component.

A homomorphic multiplication for messages belonging to the discrete torus is much more complicated to develop and to implement. It will be presented later, after having described a new bootstrapping technique for messages belonging to the discrete torus (as this bootstrapping technique is used to carry on the homomorphic multiplication in question).

Method for Bootstrapping an Encrypted Message $c_i$

A method for bootstrapping an encrypted message $c_i$=$(a_i, b_i)$, that had been determined, as described above, by encrypting a message $m_i$ using the secret key s, is presented below.

This method comprises a homomorphic determination of a refreshed encrypted message $c_i'$=$(a_i', b_i')$, which is an encrypted version of a value $g(m_i)$ of a function g applied to the message $m_i$, $c_i'$ having a noise component $e_i'$ smaller than the noise component $e_i$ of $c_i$. The result $c_i'$ of this bootstrapping method, applied to $c_i$, is noted $G(c_i)$.

So, this new bootstrapping method is a bootstrapping method adapted to messages $m_i$ that belong to the discrete torus $T_{pi}$. It enables to refresh encrypted messages $c_i$ associated to such messages $m_i$, that is to say to reduce the noise components $e_i$ of these cypher texts $c_i$. And it enables also, at the same time, to apply an arbitrary function g to the message $m_i$. In other words, this method enables to homomorphically determine the value $g(m_i)$ of the function g, applied to $m_i$.

The function g can be any function from $T_{pi}$ to $T_{pi}$. In other words, g maps elements of $T_{pi}$ to elements of $T_{pi}$ (or elements of $T_{pi,N}[X]$ to elements of $T_{pi,N}[X]$).

The determination of $c_i'$ comprises a step of determining homomorphically the constant coefficient $\mathrm{coef}_0(X^q \cdot W_g(X))$ of a polynomial $X^q \cdot W_g(X)$ mod $(X^N+1)$, where q is the integer number that is the nearest to $2N(b_i−a_i \cdot s)$: $q=\lfloor 2N(b_i−a_i \cdot s) \rceil$.

The homomorphic determination of $\mathrm{coef}_0(X^q \cdot W_g(X))$ is carried on in a way similar to prior art techniques, like described in section 6 of Ilaria Chillotti, Nicolas Gama, Mariya Georgieva, and Malika Izabachène, "TFHE: Fast fully homomorphic encryption over the torus", Journal of Cryptology, 33(1):34-91, 2020, for instance, but using a specially designed polynomial $W_g(X)$, associated to the function g considered.

The coefficients of the polynomial $W_g(X)$, of degree N−1, are noted $w_j$:

$$W_g(X) = \sum_{j=0}^{N-1} w_j \cdot X^j$$

They belong each to $T_{pi}$ and are determined as follow. Let's consider a function $f_w$, from Z to $T_{pi}$, defined as:

$$f_w : z \to f_w(z) = (-1)^{\lceil z/N \rceil} \cdot w_{j'}, \text{ where } j' = N \lceil z/N \rceil - z$$

$\lceil \cdot \rceil$ denoting the ceiling function.

The coefficients $w_j$ of $W_g(X)$ are then defined, depending on g, such that, for any $m_i$ belonging to $T_{pi}$:

$$f_w(\lfloor 2Nm_i \rceil) = g(m_i)$$

So, the coefficients $w_j$ are related to the function g by the following equation:

$$(-1)^{\lceil \lfloor 2Nm_i \rceil / N \rceil} \cdot w_{j'} = g(m_i), \text{ where } j' = N \lceil \lfloor 2Nm_i \rceil / N \rceil - \lfloor 2Nm_i \rceil$$

It can be proven that, given that $p_i$ is odd, and that twice the difference between any two of the elements of the discrete set considered (namely $T_{pi}$, here) is not an integer number:

a) it is possible, for any function g from $T_{pi}$ to T (and more generally for any function from any discrete set of $p_i$ elements such as defined above, to T), to construct a corresponding function $f_w$, and thus a polynomial $W_g(X)$, that fulfills the conditions given above, and that b) thanks to this particular choice of polynomial (i.e.: thanks to the use of the particular polynomial $W_g(X)$), homomorphically determining $\mathrm{coef}_0(X^q \cdot W_g(X))$ actually leads to the determination of an encrypted version of $g(m_i)$.

The detailed (and quite elaborate) proof of these results is not presented here, for the sake of conciseness and as it not directly useful in view of implementing the instant technology.

Still, it is noted that point a) is far from being immediate. Indeed, it can be readily noted that, for any z belonging to Z, $$f_w(z+N) = -f_w(z) = f_w(z-N)$$

So the function $f_w$ defined above is quite constrained, and a detailed analysis is in fact required to ensure that an adequate $f_w$ function can actually be constructed for any function g (provided that the conditions above, regarding $p_i$ and the elements of the set, are fulfilled).

It may be noted that this bootstrapping technique, presented above in the case where the discrete set with $p_i$ elements is $T_{pi}$ (or $T_{pi,N}[X]$), can be applied as well in the case of another discrete set consisting of $p_i$ elements (with pi odd, and such that twice the difference between any two of the elements of this set is not an integer number). In particular, the formula giving the values of the coefficients $w_j$ of the polynomial $W_g$ remains the same.

As mentioned in the section entitled "summary", the degree N−1 of the polynomial $W_g(X)$ can be chosen so that N is below 50 times $p_i$, or even below 30 times $p_i$, which is high enough to avoid enables erasing or degrading the message $m_i$, while leading to a reasonably fast execution of this bootstrapping procedure.

Besides, N may be chosen as equal to or higher $p_i$, or even than 5 times $p_i$. The coefficients $w_j$ of $W_g(X)$ are then numerous enough to adjust the polynomial $W_g(X)$ to any, arbitrary function g, from $T_{pi}$ to $T_{pi}$.

Some details regarding the homomorphic evaluation of $\mathrm{coef}_0(X^q \cdot W_g(X))$ in itself are presented now. They are outlined briefly, as this evaluation is carried on in a way similar to prior art techniques (such as the one described in ***Ref1), apart from the specific choice of the polynomial $W_g(X)$.

As known in the art, a polynomial such as $X^q \cdot W_g(X)$ modulo $(X^N+1)$ can be decomposed into several successive modular products:

$$X^q \cdot W_g(X) = X^{-\bar{a}_n s_n} \cdot ( \ldots (X^{-\bar{a}_1 s_1} \cdot (X^{-\bar{b}} \cdot W_g(X))) \ldots )$$

where $\bar{b} - \Sigma_{k=1}^{n} \bar{a}_k s_k \approx \lfloor 2N(b_i - a_i \cdot s) \rceil = q$.

In the equation above, each product "·" is a modular product: the left term, for instance $X^{-\bar{b}}$, or $X^{-\bar{a}_1 s_1}$, belongs to $Z_N[X]$, while the right term, for instance $W_g(X)$, or $(X^{-\bar{b}} \cdot W_g(X))$, belongs to $T_{pi,N}[X]$. Such a product is completely similar to the product $y \cdot m_i$ of an integer number $y$ with a number $m_i$ belonging to $T_{pi}$, which is usually designated as a modular product (due to the modular structure of $T_{pi}$, defined modulo 1).

It is known that a modular product $y \cdot m_i$, or $X^j \cdot W_g(X)$, can be computed homomorphically in the form of a so-called external product $X_S(y) \boxdot \tilde{\varphi}_s(m_i)$ where $\tilde{\varphi}_s(m_i) = c_i$ is the encrypted version of the message $m_i$ ($c_i$ being computed as explained above), and where $X_S(z)$ is the so-called TGSW encrypted form of $z$ (TGSW standing for "Gentry, Sahai, Waters" Torus encryption, the TGSW scheme having been suggested in the article "Homomorphic encryption from learning with errors: Conceptually-simpler, asymptotically-faster, attribute-based", by C. Gentry, A. Sahai, and B. Waters, InCrypto '13, 2013).

Besides, as known in the art, a quantity like $X_S(X^{-\bar{a}_k s_k}) \boxdot \tilde{\varphi}_s(m)$ can be computed without knowing the secret key component $s_k$, $k=1 \ldots n$ (more generally, without knowing the secret key $s$).

Indeed, as the secret key components $s_k$, $k=1 \ldots n$ belong each to $B=\{0, 1\}$, the quantity $X^{-\bar{a}_k s_k}$ is equal to $(X^{-\bar{a}_k}-1)s_k+1$ which is encrypted as $(X^{-\bar{a}_k}-1) \cdot X_S(s_k) + H_B^l$.

And so, an encrypted version of $X^q \cdot W_g(X)$ modulo $(X^N+1)$ can be computed without knowing or having access to the secret key $s$ as it can be computed using an encrypted versions $X_S(s_k)$ of the secret key components $s_k$, sometimes designated as a Bootstrap Key $BK_k$ in the literature. Usually, the Bootstrap Key $BK_k = X_S(s_k)$, which is an encrypted version of the secret key component $s_k$, encrypted using another key s', is a public key.

The way to compute the TGSW encrypted version $X_S(y)$ of an integer number $y$ or, equivalently, to compute the TRGSW (GSW Torus 'Ring') encrypted version $X_{S'}(P)$ of a polynomial P belonging to $Z_N[X]$, is recalled below. The way to compute the external product $\boxdot$ is also recalled.

$X_S(y)$ is defined as being equal to $Z + yH_B^l$ with:

$$Z = \begin{pmatrix} z_1 \\ \vdots \\ z_{l(n+1)} \end{pmatrix},$$

where the $z_j$, $j=1 \ldots l(n+1)$ are $l(n+1)$ distinct encrypted versions of 0, the null value 0 being encrypted with s': $z_j = \tilde{\varphi}_{S'}(0)$, and where $l$ is a given, fixed integer number; and $H_B^l$ a matrix whose dimension is $(n+1) \times (n+1) \times l$ and whose coefficients belong to the Torus T, $H_B^l$ being equal to:

$$H_B^l = \begin{pmatrix} h & 0 & \cdots \\ 0 & h & \cdots \\ \vdots & \ddots & \ddots \end{pmatrix} \text{ with } h = \begin{pmatrix} 1/B \\ \vdots \\ 1/B^l \end{pmatrix},$$

B being an integer number higher than or equal to 2.

The external product $C \boxdot c$, between:
an encrypted message $c = \tilde{\varphi}_S(m)$, $c \in T^{n+1}$, corresponding to a message $m$ belonging to the discrete torus $T_{pi}$, more generally to the torus T, and
an encrypted version $C = X_S(y)$ of an integer number $y$, $C \in \mathcal{M}_{(n+1)l,n+1}(T)$, is computed as explained below.

The n+1 components $c_j$, $j=1 \ldots n+1$ of the encrypted message $c = \tilde{\varphi}_S(m)$ are each decomposed, using a kind of numeral system of base B (like the one used to compute $X_S$):

$$c_j \approx \sum_{u=1}^{l} \frac{c_j^u}{B^u} \mod(1),$$

$$0 \leq |c_j^u| \leq B - 1$$

Then, one computes $$C \boxdot c = \Sigma_{B,l}(c) C$$

where $\Sigma_{B,l}(c) C$ denotes the usual row-vector matrix product and where $\Sigma_{B,l}(c)$ is a matrix of dimension $(n+1) \times l$ whose expression is:

$$\Sigma_{B,l}(c) = (\sigma_{B,l}(c_1), \ldots, \sigma_{B,l}(c_j), \ldots, \sigma_{B,l}(c_{n+1}))$$

with $\sigma_{B,l}(c_j) = (c_j^1, \ldots, c_j^u, \ldots, c_j^l)^T$.

The result, $C \boxdot c$, which belongs to $T^{n+1}$, is an encrypted version of $y \cdot m$. In other words, decrypting this quantity using s gives $y \cdot m$.

This technique can be applied to any message m belonging to the torus T. So, it can also be applied, like here, to messages belonging to the discrete torus $T_{pi}$.

Homomorphic Multiplication

First, it is noted that the usual, natural multiplication cannot be used as such for multiplying two messages belonging to the discrete torus $T_{pi}$.

For elements belonging to the discrete torus $T_{pi}$, a multiplication, noted $\times_T$, can however be defined, according to the following equation:

$$m3_i = m1_i \times_T m2_i := (x1_i \cdot x2_i \mod(p_i))/p_i = (m1_i \cdot m2_i) \cdot p_i \mod (1)$$

where $m1_i = x1_i/p_i$ and $m2_i = x2_i/p_i$ each belong each to $T_{pi}$, $x1_i$ and $x2_i$ being integer numbers, and where "·" is the usual, natural multiplication.

Clearly, the product $m3_i = m1_i \times_T m2_i$ belongs also to $T_{pi}$. Besides, this multiplication between elements of the discrete torus complies with the modular nature of $T_{pi}$. Indeed, for any couple of messages $m1_i$, $m2_i$ belonging to $T_{pi}^2$:

$$(m1_i+1) \times_T m2_i = ((x1_i+p_i) \cdot x2_i \mod(p_i))/p_i = (x1_i \cdot x2_i \mod (p_i))/p_i$$

as $x2_i$ is an integer number, and so, $(m1_i+1) \times_T m2_i = m1_i \times_T m2_i$.

The homomorphic multiplication procedure described here is noted $\odot$.

It produces a cyphertext $c3_i = c1_i \odot c2_i$ which is an encrypted version of $m3_i = m1_i \times_T m2_i$, $c1_i$ and $c2_i$ being encrypted versions of $m1_i$ and $m2_i$ respectively.

To determine $c3_i$, that is to say to determine homomorphically the quantity $(x1_i \cdot x2_i)/p_i \mod (1)$, the bootstrapping procedure described above is exploited, as well as the fact that $xy = ((x+y)^2 - (x-y)^2)/4$.

This identity is employed to switch from the two-operands multiplication operation xy to a single-operand squaring operation, this squaring operation being carried on homomorphically thanks to this specific bootstrapping procedure (thanks to an appropriate choice of the function g).

More precisely, to determine homomorphically $m1_i \times_T m2_i = (x1_i \cdot x2_i)/p_i \mod(1)$, one determines homomorphically the quantity M below:

$$M = \frac{(p_i+1)}{2} \cdot \left[\frac{(p_i+1)}{2} \cdot p_i \cdot (m1_i + m2_i)^2 - \frac{(p_i+1)}{2} \cdot p_i \cdot (m1_i - m2_i)^2\right]$$

where $(m1_i + m2_i)^2 = (m1_i + m2_i) \cdot (m1_i + m2_i)$, "·" being the usual, natural multiplication.

Indeed, $$\frac{(p_i+1)}{2} \cdot \left[\frac{(p_i+1)}{2} \cdot p_i \cdot (m1_i + m2_i)^2 - \frac{(p_i+1)}{2} \cdot p_i \cdot (m1_i - m2_i)^2\right] =$$

$$\frac{(p_i+1)}{2} \cdot \left[\frac{(p_i+1)}{2} \cdot \frac{(x1_i + x2_i)^2}{p_i} - \frac{(p_i+1)}{2} \cdot \frac{(x1_i - x2_i)^2}{p_i}\right] =$$

$$\frac{(p_i+1)}{2} \cdot 2 \cdot \frac{x1_i \cdot x2_i}{p_i} = \frac{x1_i \times x2_i}{p_i}$$

as $(p_i+1)/2$ is the inverse of 2, in $Z_{pi}$.

In this respect, it is noted that it is useful to have $p_i$ odd, as it allows 2 to be inversible, in $Z_{pi}$.

To determine homomorphically the quantity $$\frac{(p_i+1)}{2} \cdot p_i \cdot (m1_i + m2_i)^2 - \frac{(p_i+1)}{2} \cdot p_i \cdot (m1_i - m2_i)^2$$

one computes $G_{sq}(c1_i \oplus c2_i) \ominus G_{sq}(c1_i \ominus c2_i)$ where $G_{sq}$ denotes the bootstrapping procedure described above, in the particular case where the function g is the function:

$$g_{sq}: m_i = x_i/p_i \rightarrow \frac{(p_i+1)}{2} \cdot p_i \cdot (m_i)^2 = \frac{(p_i+1)}{2} \cdot [(x_i)^2/p_i \mod(1)]$$

And so, finally $c3_i$ is determined, homomorphically, from $c1_i$ and $c2_i$, according to the following equation, where ⊡ is the external product mentioned above (see FIG. 1):

$$c3_i = c1_i \odot c2_i = \chi_S\left(\frac{p_i+1}{2}\right) \boxdot [G_{sq}(c1_i \oplus c2_i) \ominus G_{sq}(c1_i \ominus c2_i)]$$

As the skilled person will appreciate, several modifications can be made to this homomorphic multiplication procedure, without departing from the disclosed technology. For instance, instead of using the bootstrapping "function" $G_{sq}$ to determine homomorphically the quantity M, one could use another bootstrapping "function", noted $G_{sq'}$, which corresponds to the bootstrapping procedure described above in the particular case where the function g is the function:

$$g_{sq'}: m_i = x_i/p_i \rightarrow m_i \times_T m_i = p_i \cdot (m_i)^2 = (x_i)^2/p_i \mod(1)$$

In this case the encrypted product ca is determined, homomorphically, according to the following equation:

$$c3_i = \chi_S\left(\frac{p_i+1}{2}\right)\boxdot$$

$$\left(\chi_S\left(\frac{p_i+1}{2}\right)\boxdot G_{sq'}(c1_i \oplus c2_i)\right) \ominus \left(\chi_S\left(\frac{p_i+1}{2}\right)\boxdot G_{sq'}(c1_i \ominus c2_i)\right)]$$

Still, using $G_{sq}$ will enable a faster computation than $G_{sq'}$, as it prevents from computing two extra external products ⊡.

And for even faster computation, $c3_i$ could be determined homomorphically, from $c1_i$ and $c2_i$, according to the following equation:

$$c3_i = c1_i \odot c2_i = G_{sq''}(c1_i \oplus c2_i) \ominus G_{sq''}(c1_i \ominus c2_i)$$

where $G_{sq''}$ denotes the bootstrapping function presented above in the case where the function g is the function:

$$g_{sq''}: m_i = x_i/p_i \rightarrow \left[\frac{(p_i+1)}{2}\right]^2 \cdot p_i \cdot (m_i)^2 = \left[\frac{(p_i+1)}{2}\right]^2 \cdot [(x_i)^2/p_i \mod(1)]$$

Homomorphic Evaluation of a Two-Variable Function

The disclosed technology concerns also a method for evaluating a two-variable function, that is an arbitrary two-operands function, homomorphically.

Being able to evaluate such a quantity is very useful for homomorphic data bases processing. Indeed, it enables, inter alia, to compare two ciphers texts $c1_i$ and $c2_i$ without decrypting them (for instance to sort the data base). To this end, the two-variable function employed could be the Max, or Min function. In this respect, one may note that a function returning (in an encrypted form) the maximum, or the minimum of a set of two messages is a two-variable function. And due to the modular nature of the messages employed here, the maximum or minimum of two messages cannot be determined by simply looking at the sign of the difference of these two messages.

As explained below, to evaluate homomorphically a two-variable function f, each of the two inputs of this function (which belong each to $T_{pi}$) is mapped on a specifically designed set of values $\underline{S}$. The elements $\underline{\mu}_j$ of $\underline{S}$ belong each to T, and such that, for any set of indexes (i,j,k,l) with (i,j)≠(k,l, (k,l) being also different from (j,i): $\alpha \cdot \underline{\mu}_i + \beta \cdot \underline{\mu}_j$ is different from $\alpha \cdot \underline{\mu}_k + \beta \cdot \underline{\mu}_l$, modulo ½, where α and β are two constant and integer, given numbers.

So:

∀(i,j)≠(k,l), with (j,i)≠:$\alpha \cdot \underline{\mu}_i + \beta \cdot \underline{\mu}_j \neq \alpha \cdot \underline{\mu}_k + \beta \cdot \underline{\mu}_l$ and $\alpha \cdot \underline{\mu}_i + \beta \cdot \underline{\mu}_j \neq \alpha \cdot \underline{\mu}_k + \beta \cdot \underline{\mu}_l + 1/2$ Then, taking advantage of this property, the two-operand function f is transformed into a one-operand function $g_f$ by first computing a linear combination of these two messages (multiplied respectively by the coefficients α and β), in order to obtain a single operand (the two messages having been preliminarily mapped onto $\underline{S}$). The one-operand function $g_f$ is then homomorphically evaluated, by using the specific bootstrapping procedure described above.

More precisely, the two input messages $m1_i$ and $m2_i$ are first mapped onto corresponding elements of $\underline{S}$, thanks to a mapping function $g_{map}$:

$$g_{map}: \forall m \in T_{pi} \rightarrow \underline{m} = g_{map}(m) \in \underline{S}$$

where $\underline{m}$ is one of the elements of $\underline{S}$.

$g_{map}$ is chosen among the different possible functions that map $T_{pi}$ on $\underline{S}$.

It may be noted that it can be proven that it is always possible to build a set $\underline{S}$ fulfilling the condition above (and fulfilling also one the additional conditions given below for $\underline{S}$). In practice, the set $\underline{S}$ can be chosen among different sets fulfilling these conditions. Preferably, the set S that is chosen is the one for which the values $\underline{\mu}_j$ of the set are the more spaced apart from each other.

The "mapped" messages associated respectively to $m1_i$ and $m2_i$ are noted $\underline{m1}_i$ and $\underline{m2}_i$ respectively: $\underline{m1}_i = g_{map}(m1_i)$, $\underline{m2}_i = g_{map}(m2_i)$ The "one-operand" function $g_f$ corresponding to f is then defined as:

$$\forall (m1_j, m2_j) \in T_{pi}^2 g_f(\alpha \cdot \underline{m1}_j + \beta \cdot \underline{m2}_j) = f(m1_j, m2_j)$$

that is:

$$\forall (m1_j, m2_j) \in T_{pi}^2 g_f[\alpha \cdot g_{map}(m1_j) + \beta \cdot g_{map}(m2_j)] = f(m1_j, m2_j)$$

The fact that two different couples of messages $(m1_i, m2_i)$ and $(m1'_i, m2'_i)$ always lead to two different values of the intermediate quantity $\alpha \cdot \underline{m1}_i + \beta \cdot \underline{m2}_i$ (respectively, $\alpha \cdot \underline{m1}'_i + \beta \cdot \underline{m2}'_i$), due to the specific structure of $\underline{S}$, is one of the elements that enables to apply the method to any, arbitrary two variable function f from $T_{pi} \times T_{pi}$ to $T_{pi}$, or even from $T_{pi} \times T_{pi}$ to T.

The encrypted version of $f(m1_i, m2_i)$ is noted $$c_{f,i} = F(c1_i, c2_i)$$

When $c_{f,i}$ is decrypted using the secret key s, it gives $f(m1_i, m2_i)$.

$c_{f,i}$ is determined, homomorphically, from the ciphertexts $c1_i$ and $c2_i$ (without decrypting $c1_i$ or $c2_i$), according to the following equation:

$$c_{f,i} = F(c1_i, c2_i) = G_f[(\alpha \cdot G_{map}(c1_i)) \oplus (\beta \cdot G_{map}(c2_i))]$$

where Gf denotes the bootstrapping function described above in the particular case where g is $g_f$, and where $G_{map}$ denotes the bootstrapping function described above, in the particular case where g is $g_{map}$.

It may be noted that the uncyphered values of $\alpha$ and $\beta$ are used directly to compute $c_{f,i}$. In other words, the coefficients $\alpha$ and $\beta$ are not ciphered.

This method can be applied to any function f (in particular, whether f is symmetric or not).

When the function f is symmetric, $\alpha$ and $\beta$ are chosen equal to each other. For instance, they may be chosen each as being equal to 1. In this case, $c_{f,i}$ is determined homomorphically from $c1_i$ and $c2_i$ according to the following equation (see FIG. 2):

$$c_{f,i} = G_f[G_{map}(c1_i) \oplus G_{map}(c2_i)]$$

This way to compute $c_{f,i}$ is beneficial as there is no multiplication by $\alpha$ or $\beta$ to be carried on, and as the noise terms are not amplified, as they are multiplied by 1.

It may be noted that the Max($c1_i$, $c2_i$) function, for instance, whose output is the cipher text $c1_i$ or $c2_i$ that is associated to the highest of the two messages $m1_i$ and $m2_i$ (highest, with respect to usual order of $T_{pi}$ values), is a symmetric function.

When the function f is not symmetric, $\alpha$ and $\beta$ are chosen different from each other, and the elements of $\underline{S}$ are such that, for any set of indexes (i,j,k,l) with (i,j)≠(k,l), $\alpha \cdot \underline{\mu}_i + \beta \cdot \underline{\mu}_j$ is different from $\alpha \cdot \underline{\mu}_k + \beta \cdot \underline{\mu}_l$ modulo ½, even when (k,l)=(j,i).

In this case, $\alpha$ and $\beta$ can be chosen as being equal to +1 and −1 respectively, for instance. $c_{f,i}$ is then determined homomorphically from $c1_i$ and $c2_i$ according to the following equation $$c_{f,i} = G_f[G_{map}(c1_i) \ominus G_{map}(c2_i)]$$

Again, this kind of implementation is beneficial, as it involves no multiplication by a coefficient higher than 1, and so no noise amplification.

This method for evaluating homomorphically a two-variable function has been presented above in a case where the function f is a function from $T_{pi} \times T_{pi}$ to $T_{pi}$, or from $T_{pi} \times T_{pi}$ to T. Still, it can be implemented identically when the two variables of the function f each belongs to a discrete set of $p_i$ elements (possibly different from $T_{pi}$, but consisting of $p_i$ elements, with pi odd, and such that twice the difference between any two of the elements of this set is not an integer number), the values of function f belonging to T.

Carry-Less Processing of a Message m, by Decomposing it into Orthogonal Sub-Messages $m_i$.

As mentioned above, the disclosed technology also concerns a technique for encrypting and processing 'very long' messages x (or m), using a specific decomposition of the message x into smaller messages $x_i$, this decomposition being based on the Chinese remainder theorem decomposition and enabling to process the sub-messages $x_i$, or, for instance, their counterparts $x_i/p_i$, separately from each other, without having to take into account possible carries.

This technique can be applied to any message belonging to $\mathbb{Z}_p = \mathbb{Z}/p\mathbb{Z}$, p being equal to $\Pi_{i=1}^r p_i$, where the integer numbers $p_i$ are pairwise coprime.

More precisely, for any message x belonging to $\mathbb{Z}_p$, the corresponding encrypted message C is determined by executing the following operations (FIG. 3):

Step D: decomposing x into its components $x_i$, i=1 ... r, with $x_i$ equal to x modulo $p_i$ (the Chinese remainder theorem stating that such a decomposition is always possible), Step E: for each component $x_i$ whose associated factor $p_i$ is odd, determining an encrypted version $c_i$ of a message $m_i$, according to the encryption method presented above, $m_i$ being, among the elements of the discrete set of $p_i$ elements mentioned above (e.g.: $T_{pi}$), the element that is associated to $x_i$ by a given bijective relationship between $\mathbb{Z}_{pi}$ and said discrete set, if a component $x_i$ is associated to a factor $p_i$ equal to 2, determining an encrypted version $c_i$ of a quantity $Q_i$ associated to $x_i$ and that can takes two distinct values, $c_i$ being equal to $(a_i, b_i)$ with $b_i = Q_i + e_i + a_i \cdot s$, returning $C = (c_1, \ldots c_i, \ldots c_r)$.

Below, we consider the case in which the discrete set consisting of $p_i$ distinct elements is $T_{pi}$. The component $x_i$ may be associated (bijectively) to a corresponding element $m_i$ of $T_{pi}$ according to the following equation, for instance: $m_i = x_i/p_i$, or according to the following equation $m_i = x_i/p_i$, or, alternatively, according to the following equation $m_i = (x_i + 1)/p_i$.

Besides, we consider below that the same secret key s is used on the different fields $\mathbb{Z}_{p1}, \ldots, \mathbb{Z}_{pi}, \ldots, \mathbb{Z}_{pr}$. In other words, here, the same secret key s is used to cipher the different messages $m_1, \ldots m_i, \ldots m_r$. Still, in alternative, different keys could be used to cipher the different (sub-)messages $m_1, \ldots m_i, \ldots m_r$.

In may be noted that, in other embodiments, the discrete set in question may be another set than $T_{pi}$, and that another operation than the one mentioned above could be used to map $\mathbb{Z}_{pi}$ onto this discrete set (for instance, mi could be obtained by multiplying $x_i$ by any integer number that is coprime with $p_i$, and then be divided by $p_i$).

Besides, here, the decomposition of x is carried on such that the only even factor $p_i$, should there be one, is two. So, except from, possibly, a factor two, all the other factors pi are odd. And so, their corresponding messages $m_i$ can all be processed, individually, according to the methods described in detail above, for elements belonging to $T_{pi}$, except, possibly, for one of them, associated to a factor $p_i$ equal to two, which is processed, for instance, according to existing, known techniques for binary messages.

When processing such an encrypted message $C=(c_1, \ldots c_i, \ldots c_r)$, or when processing a couple (C1, C2) of two such messages $C1=(c1_1, \ldots c1_i, \ldots c1_r)$ and $C2=(c2_1, \ldots c2_i, \ldots c2_r)$, the components $c_1, \ldots c_i, \ldots c_r$ of C, or the couples of components $(c1_1, c2_1) \ldots (c1_i, c2_i), \ldots (c1_r, c2_r)$ are processed, homomorphically, independently from each other (that is, without taking into account any carry).

For instance, the homomorphic addition of two such messages C1 and C2 is achieved as follow (see FIG. 4):

$$C1 \oplus C2 = (c1_1 \oplus c2_1, \ldots, c1_i \oplus c2_i \ldots c1_r \oplus c2_r)$$

Figure 5:
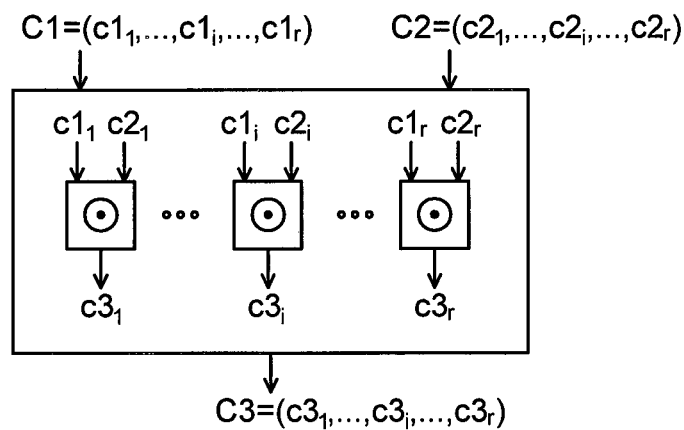
FIG. 5 represents, as a block-diagram, operations carried on to multiply homomorphically two encrypted messages, obtained previously according to the encryption step of FIG. 3, said multiplication comprising several sub-multiplications carried on according to the process represented in FIG. 1.

Similarly, the homomorphic multiplication of two such messages C1 and C2 is achieved as follow, based on the $T_{pi} \times T_{pi}$ homomorphic multiplication $\odot$ presented above (see FIG. 5):

$$C1 \odot C2 = (c1_1 \odot c2_1, \ldots, c1_i \odot c2_i \ldots c1_r \odot c2_r)$$

Similarly, a refreshed version C' of such an encrypted message $C=(c_1, \ldots c_i, \ldots c_r)$ is determined by computing the following quantity $C'=(G(c_1), \ldots G(c_i), \ldots, G(c_r))$.

Electronic Devices and System

Figure 6:
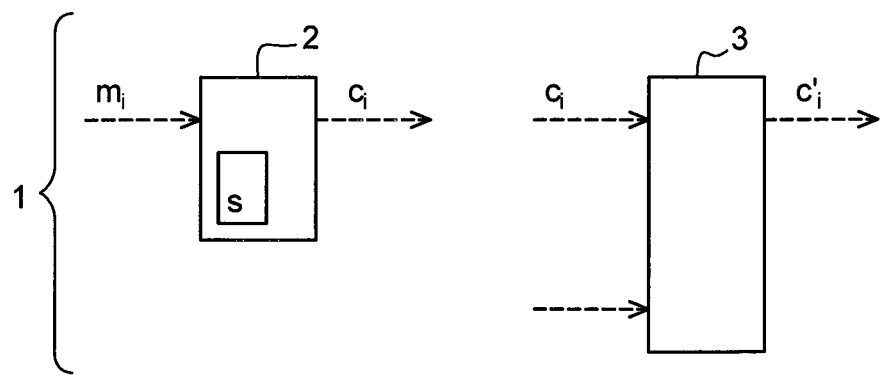
FIG. 6 schematically illustrate a cryptographic system according to the disclosed technology.

FIG. 6 represents schematically a cryptographic system 1 comprising an encrypting device 2 and a processing device 3, for processing encrypted messages without decrypting them.

The encrypting device 2 and the processing device 3 comprise each at least one processor, and at least one memory.

The encrypting device 2 is programmed, or otherwise arranged for executing the following steps:
  receiving data representative of an unencrypted message $m_i$, that belongs to a discrete set consisting of $p_i$ distinct elements, with $p_i$ being an odd number, said discrete set being the discrete torus $$T_{pi} = \frac{1}{p_i}\left\{-\frac{p_i-1}{2}, -\frac{p_i-1}{2}+1, \ldots, \frac{p_i-1}{2}-1, \frac{p_i-1}{2}\right\},$$

or the set $T_{pi,N}[X]$ of polynomials of degree N−1 whose coefficients belong to $T_{pi}$, or to another discrete set in bijective relationship with $T_{pi}$,
  processing said data according to the method for encrypting such messages, that has been presented above, to determine encrypted data representative of the encrypted message $c_i$, the secret key s employed during said processing, for instance stored, at least temporarily, in the memory of the encrypting device, being accessed by the processor or processors during said processing.

The processing device 3, which is distinct from the encrypting device 2, is configured for receiving the encrypted message $c_i$ from the encrypting device 2, and, possibly, to receive other such encrypted messages.

The processing device 3 is programmed, or otherwise arranged to execute the following steps:
  receiving data, representative of the encrypted message $c_i$ produced by the encrypting device 2,
  processing said data, according to the method for bootstrapping described above, to determine refreshed data, representative of the encrypted message $c'_i$, said processing being achieved without decrypting $c_i$ and without using, reading or accessing the secret key s.

In particular, during this bootstrapping, the unencrypted message $m_i$ corresponding to $c_i$ does not appear nor result from an operation, nor it is used, read or accessed. The unencrypted message $m_i$, just as the secret key s, thus remains absent from the processing device 3 at all time.

The processing device could also be programmed to execute the homomorphic multiplication method presented above and/or to homomorphic evaluate of a two-variable function like the one presented above.

The processing device 3 could also be programmed to execute one or several of the homomorphic processing methods for encrypted messages like the message $C=(c_1, \ldots c_i, \ldots c_r)$, that has been presented above. And the encrypting device 2 could be programmed to produce such encrypted messages, from unencrypted messages x belonging to $Z_p$.

The invention claimed is:

1. Method for determining an encrypted message $c_i$, which is an encrypted version of a message $m_i$, $c_i$ being equal to $(a_i, b_i)$ where $b_i$ is determined from $m_i$ and from a secret key s, $b_i$ being equal to $m_i + e_i + a_i \cdot s$ with $a_i$ being a randomly selected vector for projecting s and $e_i$ being a random noise component added to $m_i + a_i \cdot s$,
  wherein the message $m_i$ belongs to a discrete set consisting of $p_i$ distinct elements, with $p_i$ being an odd number, the elements of said discrete set being such that twice the difference between any two of these elements is not an integer number, said discrete set being the discrete torus $$T_{pi} = \frac{1}{p_i}\left\{-\frac{p_i-1}{2}, -\frac{p_i-1}{2}+1, \ldots, \frac{p_i-1}{2}-1, \frac{p_i-1}{2}\right\},$$

or the set $T_{pi,N}[X]$ of polynomials of degree N−1 whose coefficients belong to $T_{pi}$, or another discrete set in bijective relationship with $T_{pi}$.

2. A Method for bootstrapping the encrypted message $c_i=(a_i,b_i)$ determined according to claim 1, the method for bootstrapping comprising a determination of a refreshed encrypted message $c'_i=(a'_i,b'_i)$, which is an encrypted version of a value $g(m_i)$ of a function g applied to the message $m_i$, $c'_i$ having a noise component $e'_i$ smaller than $e_i$.

3. The method according to claim 2, wherein the determination of $c'_i$ comprises a step of determining homomorphically the constant coefficient $coef_0(X^q \cdot W_g(X))$ of $X^q \cdot W_g(X) \bmod (X^N+1)$, where
  $W_g(X) = \Sigma_{j=0}^{N-1} w_j \cdot X^j$ is a polynomial of degree N−1 whose coefficients $w_j$ are given by the following formula:

$$(-1)^{\lceil \lfloor 2Nm_i \rceil / N \rceil} \cdot w_j = g(m_i), \text{ where } j = N \lceil \lfloor 2Nm_i \rceil / N \rceil - \lfloor 2Nm_i \rceil$$

with $\lfloor 2Nm_i \rceil$ being the integer number that is the nearest to $2Nm_i$ and with $\lceil \lfloor 2Nm_i \rceil / N \rceil$ being the ceiling function applied to $\lfloor 2Nm_i \rceil / N$, and where
  q is the integer number that is the nearest to $2N(b_i - a_i \cdot s)$: $q = \lfloor 2N(b_i - a_i \cdot s) \rceil$.

4. The method according to claim 3, wherein N is below 50 times $p_i$, or even below 30 times $p_i$.

5. The method according to claim 3, wherein N is above $p_i$, or even above 5 times $p_i$.

6. Method for homomorphically multiplying two messages $m1_i$ and $m2_i$, each belonging to the discrete torus $T_{pi}$ or to the set of polynomials $T_{pi,N}[X]$, the method comprising a determination of an encrypted message $c3_i$ which is an encrypted version of the product of $m1_i$ by $m2_i$, $c3_i$ being determined from encrypted messages $c1_i$ and $c2_i$ without decrypting $c1_i$ or $c2_i$, $c1_i$ and $c2_i$ being encrypted versions of $m1_i$ and $m2_i$ respectively, that have been determined according to the method of claim 1, the determination of $c3_i$ comprising homomorphically determining $$\frac{(p_i+1)}{2} \cdot \left[ \frac{(p_i+1)}{2} \cdot p_i \cdot (m1_i+m2_i)^2 - \frac{(p_i+1)}{2} \cdot p_i \cdot (m1_i-m2_i)^2 \right]$$

Where $p_i \cdot (m1_i+m2_i)^2$ and $p_i \cdot (m1_i-m2_i)^2$, or $$\frac{(p_i+1)}{2} \cdot p_i \cdot (m1_i+m2_i)^2$$

and $$\frac{(p_i+1)}{2} \cdot p_i \cdot (m1_i-m2_i)^2,$$

or $$\left[\frac{(p_i+1)}{2}\right]^2 \cdot p_i \cdot (m1_i+m2_i)^2$$

and $$\left[\frac{(p_i+1)}{2}\right]^2 \cdot p_i \cdot (m1_i-m2_i)^2$$

are determined homomorphically by executing the method for bootstrapping according to any of claims 2 to 5, the function g being the function $g_{sq}$: $m_i \to p_i \cdot (m_i)^2 \bmod (1)$, or $$g_{sq}: m_i \to \frac{(p_i+1)}{2} \cdot \left[p_i \cdot (m_i)^2 \bmod(1)\right],$$

or, respectively, $$g_{sq''}: m_i \to \left[\frac{(p_i+1)}{2}\right]^2 \cdot \left[p_i \cdot (m_i)^2 \bmod(1)\right].$$

7. Method for determining an encrypted message $c_{f,i}$, which is an encrypted version of a value $f(m1_i, m2_i)$ of a two-variable function f applied to messages $m1_i$ and $m2_i$, $m1_i$ and $m2_i$ belonging each to said discrete set, $c_{f,i}$ being determined from encrypted messages $c1_i$ and $c2_i$ without decrypting $c1_i$ or $c2_i$, $c1_i$ and $c2_i$ being encrypted versions of $m1_i$ and $m2_i$ respectively, that have been determined according to the method of claim 1, the determination of $c_{f,i}$ comprising:

determining $c1'_i$ and $c2'_i$, from $c1_i$ and $c2_i$ respectively, by executing the method for bootstrapping, the function g employed during this bootstrapping being a function $g_{map}$ that maps said discrete set onto a set $\underline{S}$ whose elements $\underline{\mu}_j$ belong each to the torus $T=]-1/2, 1/2]$ and are such that, for any set of indexes (i,j,k,l) with $(i,j) \neq (k,l)$, (k,l) being different from (j,i):

$\alpha \cdot \underline{\mu}_i + \beta \cdot \underline{\mu}_j$ is different from $\alpha \cdot \underline{\mu}_k + \beta \cdot \underline{\mu}_l$ modulo 1/2, with $\alpha$ and $\beta$ being two constant and integer, given numbers, $c1'_i$ and $c2'_i$ being the encrypted versions of $\underline{m1}_i = g_{map}(m1_i)$ and $\underline{m2}_i = g_{map}(m2_i)$ respectively, where $\underline{m1}_i$ and $\underline{m2}_i$ belong each to $\underline{S}$, determining homomorphicically, from $c1'_i$ and $c2'_i$, an encrypted message $c_s$ which is an encrypted version of $\alpha \cdot \underline{m1}_i + \beta \cdot \underline{m2}_i$, determining $c_{f,i}$ from $c_s$ by executing the method for bootstrapping according to any of claims 2 to 5, the function g employed during this bootstrapping being a one-variable function $g_f$ defined by the following condition: for any couple of messages $m1_j$, $m2_j$ belonging each to said discrete set, $$g_f(\alpha \cdot m1_j + \beta \cdot m2_j) = f(m1_j, m2_j)$$

that is:

$$g_f[\alpha \cdot g_{map}(m1_i) + \beta \cdot g_{map}(m2_i)] = f(m1_i, m2_i).$$

8. The method according to claim 7, wherein the elements of the set $\underline{S}$ are such that for any set of indexes (i,j,k,l) with $(i,j) \neq (k,l)$, $\alpha \cdot \underline{\mu}_i + \beta \cdot \underline{\mu}_j$ is different from $\alpha \cdot \underline{\mu}_k + \beta \cdot \underline{\mu}_l$ modulo 1/2, even when (k,l)=(j,i).

9. The method according to claim 8, wherein $\alpha = 1$ and $\beta = -1$, $c_s$ being determined by computing the homomorphic difference $\ominus$ between $c1'_i$ and $c2'_i$: $c_s = c1'_i \ominus c2'_i$, or wherein $\alpha = -1$ and $\beta = 1$, $c_s$ being determined by computing the homomorphic difference $\ominus$ between $c2'_i$ and $c1'_i$: $c_s = c2'_i \ominus c1'_i$.

10. The method according to claim 7, wherein the function f is symmetric, $f(m1_i, m2_i)$ being equal to $f(m2_i, m1_i)$ for any couple of messages $m1_i$ and $m2_i$, and wherein $\alpha$ and $\beta$ are each equal to 1, $c_s$ being determined by computing the homomorphic sum $\ominus$ of $c1'_i$ and $c2'_i$: $c_s = c1'_i \ominus c2'_i$.

11. The method for determining an encrypted message C, which is an encrypted version of a message x belonging to $\mathbb{Z}_p = \mathbb{Z}/p\mathbb{Z}$, p being equal to $\Pi_{i=1}^{r} p_i$ where the integer numbers $p_i$ are pairwise coprime, the method comprising:

(D) decomposing x into its components $x_i$, i=1 ... r, with $x_i$ equal to x modulo $p_i$, (E) for each component $x_i$ whose associated factor $p_i$ is odd, determining an encrypted version $c_i$ of a message $m_i$, according to the method of claim 1, $m_i$ being, among the elements of said discrete set, the element that is associated to $x_i$ by a given bijective relationship between $\mathbb{Z}_{pi}$ and said discrete set, if a component $x_i$ is associated to a factor $p_i$ equal to 2, determining an encrypted version $c_i$ of a quantity $Q_i$ associated to $x_i$ and that can takes two distinct values, $c_i$ being equal to $(a_i, b_i)$ with $b_i = Q_i + e_i + a_i \cdot s$, returning $C = (c_1, \ldots c_i, \ldots c_r)$.

12. The method for bootstrapping the encrypted message $C = (c_1, \ldots c_i, \ldots c_r)$ determined according to claim 11, said method comprising:

for each $c_i$ whose associated factor $p_i$ is odd, determining a refreshed encrypted message $c'_i$, from $c_i$, by executing the method for bootstrapping, returning $C' = (c'_1, \ldots, c''_i, \ldots c''_r)$.

13. The method for determining an encrypted message $C3 = (c3_1, \ldots c3_i, \ldots c3_r)$, which is an encrypted version of the product of two messages x1 and x2, each belonging to $\mathbb{Z}_p$, C3 being determined from encrypted messages C1 and C2, without decrypting C1 or C2, C1 and C2 being encrypted versions of x1 and x2 respectively, $C1=(c1_1, \ldots c1_i, \ldots c1_r)$ and $C2=(c2_1, \ldots c2_i, \ldots c2_r)$ having been determined from x1 and x2 respectively, according to the method of claim 11, wherein said discrete set is $T_{pi}$ or $T_{pi,N}[X]$, wherein each component $c3_i$ of C3 is determined from the corresponding components $c1_i$ and $c2_i$ of C1 and C2 when $c1_i$ and $c2_i$ are associated to a factor $p_i$ that is odd.

14. Encrypting device, comprising one or more processors and at least one memory, the encrypting device being programmed to make the processor or processors executing the following steps:

receiving data representative of an unencrypted message $m_i$, that belongs to a discrete set consisting of $p_i$ distinct elements, with $p_i$ being an odd number and wherein the elements of said discrete set are such that twice the difference between any two of these elements is not an integer number, said discrete set being the discrete torus $$T_{pi} = \frac{1}{p_i}\left\{-\frac{p_i-1}{2}, -\frac{p_i-1}{2}+1, \ldots, \frac{p_i-1}{2}-1, \frac{p_i-1}{2}\right\},$$

or the set $T_{pi,N}[X]$ of polynomials of degree N−1 whose coefficients belong to $T_{pi}$, or to another discrete set in bijective relationship with $T_{pi}$, processing said data according to the method of claim 1, to determine encrypted data representative of the encrypted message $c_i$, the secret key s employed during said processing, stored at least transitorily in the memory of the encrypting device, being accessed by the processor or processors during said processing.

15. Cryptographic system comprising the encrypting device of claim 14 and a processing device, the processing device comprising one or more processors and at least one memory, the processing device being programmed to make the processor or processors executing the following steps:

receiving data, representative of the encrypted message $c_i$ that has been produced by the encrypting device, processing said data, according to a method for bootstrapping, to determine refreshed data, representative of the encrypted message $c'_i$, said processing being achieved without decrypting $c_i$ and without using, reading or accessing the secret key s.

16. A non-transitory computer-readable medium comprising instructions that, when executed by a computer, make the computer to execute the bootstrapping method according to claim 2.

17. A non-transitory computer-readable medium comprising instructions that, when executed by a computer, make the computer to execute the encrypting method according to claim 11.

* * * * *